United States Patent Office 3,337,912
Patented Aug. 29, 1967

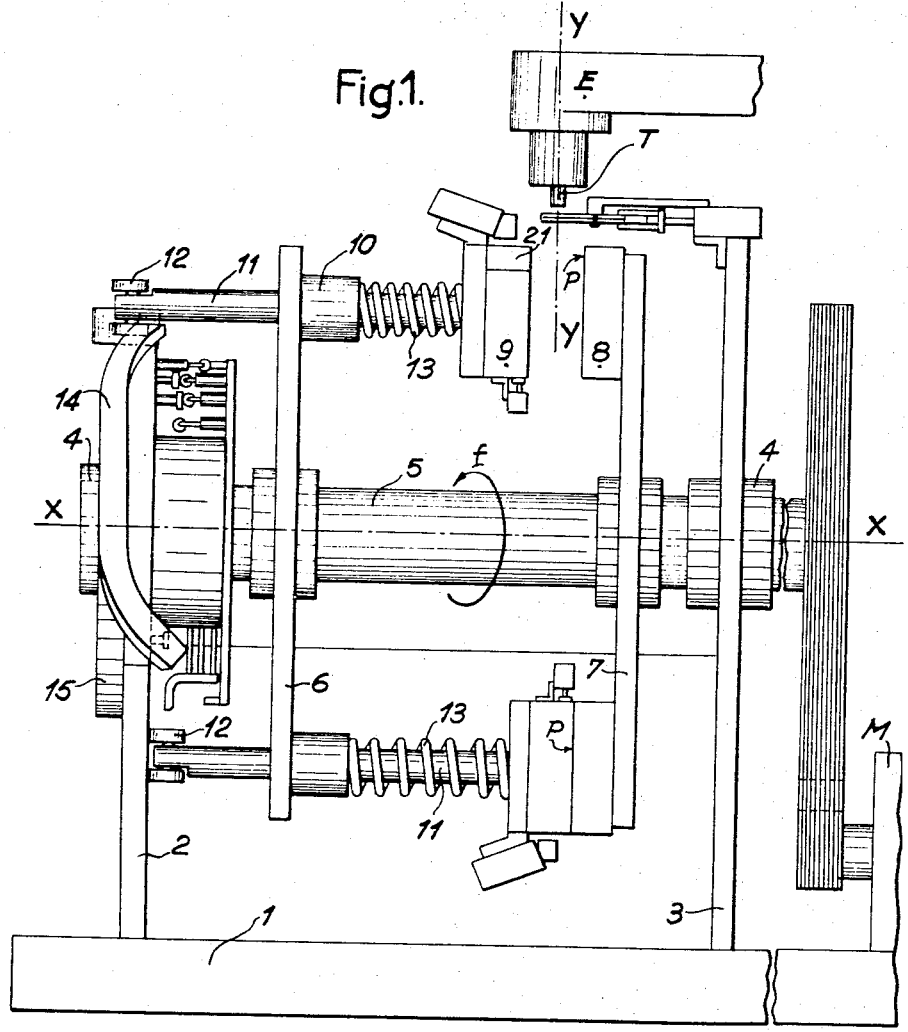

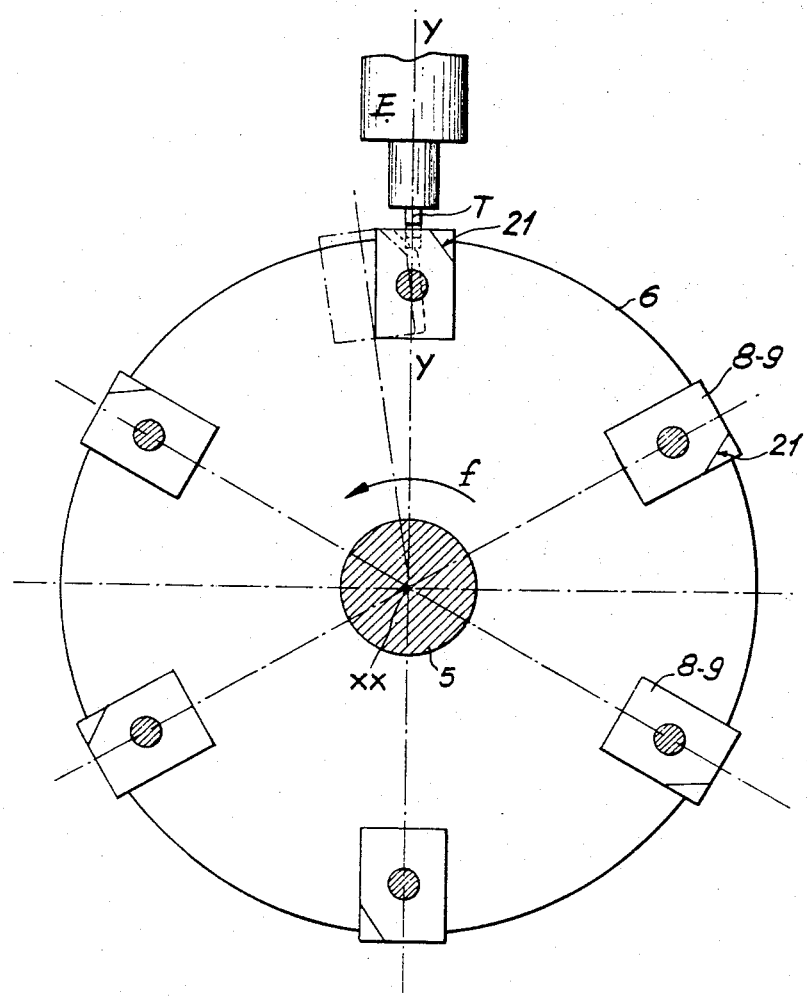

3,337,912
MOLD OF A MACHINE FOR MANUFACTURING PLASTIC CONTAINERS
Antoine Di Settembrini, 42 Residence du Petit Val, Sucy-en-Brie, France
Filed Oct. 6, 1964, Ser. No. 401,874
Claims priority, application France, Nov. 21, 1963, Patent 1,392,517; July 10, 1964, 981,455
1 Claim. (Cl. 18—5)

ABSTRACT OF THE DISCLOSURE

In a machine for molding bottles of thermoplastic material by extrusion and blowing, one of the two half-molds constituting each mold has its upper portion, considered in relation to its position when the mold concerned registers with, and is positioned beneath, the extruder, formed with a canted wall.

---

This invention relates to the manufacture of plastic containers and has specific reference to a machine designed for manufacturing plastic bottles.

This machine pertains to the known type wherein a number of molds are conveyed continuously past an extruder producing a tubular blank or parison of plastic material. Each mold is reclosed in succession on a parison section and the latter is subjected within the mold to an expansion by internal blowing so as to take the exact shape of the mold impression which corresponds to that of the desired bottle. Subsequent to this shaping step and after a sufficient cooling time the mold is opened to permit the stripping and release of the shaped bottle, and the same cycle is resumed with a fresh mold.

It is clear that a machine of this general character cannot operate properly unless the various means incorporated therein, such as the extruder, the rotary mold support and the blowing unit are discerningly associated with one another. Thus, if the molds revolve continuously without pausing to permit the introduction of the tubular blank into each mold, and if the extruder is also operated continuously, the extruder should be capable of producing, between two successive passages of the molds under the extruder, a blank length or section at least sufficient to fill up a mold therewith; therefore, the rate of feed of the molds and the extrusion rate of the extruder should be calculated accordingly.

In machines comprising a plurality of molds disposed radially in a common plane revolving about a horizontal axis as well as an extruder head disposed radially in relation to the rotary mold assembly, this extruder head producing a parison as a continuous extruded product directed vertically downwards, the circular path followed by the molds intersects the vertical extrusion direction. Under these conditions provision should be made to prevent the circular mold path from interfering with the continuous parison extrusion, the parison abutting for instance against the molds. To avoid this inconvenience three means have been used in hitherto known machines of this type:

The first means consists in pivoting, rocking or otherwise moving the extruder head to permit the free passage of each mold (retractable extruder head), the head being allowed to resume its normal feeding position when another open mold is presented thereto. This arrangement obviously constitutes a considerable mechanical complication.

The second means consists in reducing the extrusion rate and spacing the molds from each other sufficiently to cause a parison of proper length to be produced when another mold is presented under the extruder. It also consists in reducing the mold length and therefore the length of the final product in order to minimize the length of the parison section to be introduced into each mold. This second means is objectionable in that the production of the machine is reduced to a substantial extent. In fact, when the extrusion rate is reduced two solutions may be adopted for spacing the molds sufficiently from each other:

(a) A smaller number of molds are mounted on a rotary support or drum of adequate diameter, so that the gap formed between any two adjacent molds corresponds to the time required for producing a sufficient length of tubular parison;

(b) Alternatively, the molds are mounted at a radial distance from the axis of rotation sufficient to provide an adequate relative spacing between any two adjacent molds. Obviously, this solution leads to prohibitive supporting drum dimensions and therefore to considerable over-all dimensions of the machine.

On the other hand, reducing the height or length of the molds and therefore the height or length of the molding impressions formed therein is obviously attended by a limitation of the maximum dimension of the bottles that can be produced with a given machine.

The third means consists in operating the extruder discontinuously, that is, by stopping same as a mold has just been re-closed under the outlet orifice of the extruder for retaining a tubular blank section, and that the leading end of the next tubular blank may strike the upper portion of the mold, then re-starting the extruder when the mold has retracted from the path of the tubular parison. This solution is attended by serious drawbacks as far as the quality of the extruded plastic material is concerned if the pause is too long. In fact, the plastic material may become too fluid and even decomposed as a consequence of overheating caused by an extended residence time in the extruder. Consequently, when the extruder is re-started the first portion of the extruded plastic blank must be discarded until a tubular blank of adequate quality and regular shape is delivered by the outlet orifice of the extruder. In certain cases, if the time during which the extruding process has been stopped is too long, the extruder must be disassembled to free its interior from any scrap of decomposed plastic material. Therefore, this solution is attended by a loss of time and material.

It is the essential object of this invention to provide an improved machine of the type set forth hereinabove which is capable of high production rates (high extrusion rate and rapid mold rotation) according to the continuous cycle method, by using extremely simple means while avoiding all the drawbacks disclosed hereinabove.

To this end, the machine according to this invention for molding thermoplastic bottles by extrusion and internal blowing is characterized in that at least the movable mold-half has a cant wall between its top face and the lateral face perpendicular to the joint plane, said lateral face being the last to pass under the extruder.

With this arrangement the extrusion may take place at a relatively high rate without impairment thereof by the mold passage under the extruder head.

Other features and advantages of this invention will appear as the following description proceeds with reference to the accompanying diagrammatic drawings in which:

FIGURE 1 is a diagrammatic elevational view showing a typical form of embodiment of a machine constructed according to the teachings of this invention;

FIGURE 2 is an end view.

The machine according to this invention comprises a frame structure consisting essentially of a base plate or bed 1 and a pair of parallel vertical side flanges 2, 3. These flanges carry bearings 4 in which a main shaft 5 is journalled for rotation about the axis XX; this shaft 5 is driven continuously in the direction of the arrow $f$ from a motor and variator unit M through adequate belt and pulley transmission means.

The extruder unit E shown only in very diagrammatic form in the drawing is carried by the aforesaid frame structure. The extrusion head is disposed according to a vertical axis YY intersecting the axis XX of shaft 5 and therefore extends radially thereto. This extruder E produces a tubular blank or parison T for example of rigid polyvinyl chloride.

The machine comprises furthermore a rotary mold support, the molding impressions or cavities of these molds having the shape and dimensions of the bottles to be manufactured. This support may assume substantially the shape of a rotary drum.

The rotary mold support mounted on shaft 5 consists of a pair of parallel vertical circular plates 6, 7 rigid with shaft 5 and carrying metal molds. In this example the support carries six molds, but it is clear that this number is not critical. The molds disposed at spaced annular intervals at the outer periphery of the plates consist of two portions or mold halves, that is, a fixed half-mold 8 and a movable half-mold 9, these half-molds being separated from each other by a vertical joint plane P. Plate 7 carries the fixed half-molds 8 secured thereon (on the side of the extruder E) and plate 6 carries the movable half-molds 9 but so mounted as to be movable in a direction parallel to the shaft axis XX. To this end the plate 6 carries on its outer peripheral portion as many sockets 10 as there are molds in the machine. These sockets register with the fixed half-molds 8. Each socket 10 has slidably mounted therein a rod 11 carrying at one end the corresponding movable half-mold 9 and at the opposite end a pair of rollers 12 engaging a cam face of the mold opening and closing mechanism to be described presently. Each movable half-mold 9 is resiliently urged to its closed position, that is, in engagement with the corresponding fixed half-mold, by a return coil spring 13 surrounding the rod 11 and reacting between the movable half-mold 9 and the relevant socket 10, as shown.

The movement of translation parallel to the axis XX which is thus imparted to the movable mold halves 9 for opening and closing the molds is obtained by using mechanical means comprising a cam member 14 carried by an annular plate 15 concentric with the axis XX and secured on the lateral flange 2 of the frame structure of the machine.

According to this invention and as shown in FIGURES 1 and 2 a cant wall 21 is provided at the upper portion of the movable mold half 9 in order to eliminate the rear edge of this mold half at right angles to the joint plane P. To facilitate the manufacture of the molds, this cant wall may also be formed on the fixed mold half, although it is not required.

To illustrate the effectiveness of this arrangement there is shown in thick lines, broken lines and chain-dotted lines respectively, in FIGURE 2, the successive positions of a mold overstepping the extruder head E and the successive positions of the leading end of the extruded parison. As shown, with only a moderate angle of rotation of the mold the cant wall 21 enables the parison T to descend to a considerable extent, as near as possible to the outer wall of the mold, without abutting thereagainst. If this cant wall were not provided the parison head would be stopped by the upper or peripheral portion of the mold and prevented from descending below the thick-line position, even after the mold has moved to the position shown in chain-dotted position. Under these conditions it is clear that the cant wall 21 enables the parison to be lowered considerably more than if this cant wall were not provided and therefore it affords a higher extrusion rate. Now, due to the increased and considerable extrusion rate more time is available for the extruder to produce a parison section of considerable length in the time period elapsing between the passage of two successive molds. Thus, this arrangement not only affords the use of relatively high molds to produce large-sized bottles of corresponding large capacity, but is advantageous in relation to the state of the art (given equal bottle dimensions) in that the molds can be spaced a shorter relative distance apart, thus reducing accordingly the angular gap required between adjacent molds and consequently decreasing the over-all dimensions of the rotary mold support. Therefore, the cant wall 21 affords a higher production rate and reduces the over-all dimensions of the machine.

Although the specific forms of embodiment shown and described herein refer to a six-mold machine wherein the molds are disposed at spaced intervals on a concentric rotary plate, it is obvious for anybody conversant with the art that this invention is also applicable to a machine comprising a different number of molds as consistent with the desired production rate and the dimensional characteristics of the plate, and also with the operation of the extruder.

Finally, the machine of this invention is also suitable for use in the manufacture of bottles of any desired thermoplastic material, whether organic or inorganic, that is, any material adapted to soften in a reversible manner under the action of heat.

What I claim is:

In a machine for molding bottles of thermoplastic material by extrusion and blowing, which comprises a movable support, means for driving said support, a plurality of molds mounted on said support, each mold being divided into two portions by a joint plane and comprising a fixed half-mold secured on said support and a movable half-mold displaceable on said support, an extruder adapted to produce a tubular parison along a vertical extrusion axis, said molds being adapted to register in succession with the lower end of said extruder, and blowing means associated with each mold, the improvement consisting in that at least one of said two half-molds constituting each mold has its upper portion, considered in relation to its position when the mold concerned registers with, and is positioned beneath, said extruder, formed with a canted wall with a view to eliminate the rear edge of said half-mold which extends at right angles to said joint plane, which is the edge passing under the extruder after the aforesaid parison has been introduced into the mold.

References Cited

UNITED STATES PATENTS 2,579,399 12/1951 Ruekberg _____ 18—5
2,784,452 3/1957 Ruekberg _____ 18—5
3,005,231 10/1961 Pechthold _____ 18—5

J. SPENCER OVERHOLSER, *Primary Examiner.*

W. L. McBAY, *Assistant Examiner.*